US005165991A

United States Patent [19]

Fukuda et al.

[11] Patent Number: 5,165,991

[45] Date of Patent: Nov. 24, 1992

[54] DIELECTRIC MEMBER FOR RECEIVING AN ELECTROSTATIC IMAGE

[75] Inventors: Yuzuru Fukuda; Shigeru Yagi, both of Kanagawa, Japan

[73] Assignee: Fuji Xerox Co., Ltd., Tokyo, Japan

[21] Appl. No.: 764,850

[22] Filed: Sep. 24, 1991

[30] Foreign Application Priority Data

Dec. 15, 1990 [JP] Japan .................................. 2-419033

[51] Int. Cl.[5] .................................................. B32B 9/00

[52] U.S. Cl. ............................... 428/306.6; 428/307.3; 428/307.7; 428/446; 428/698; 428/195

[58] Field of Search ............ 428/195, 446, 698, 306.6, 428/307.3, 307.7

[56] References Cited

U.S. PATENT DOCUMENTS 4,518,468 5/1985 Fotland et al. ..................... 204/38.3

FOREIGN PATENT DOCUMENTS 60-50083 3/1985 Japan .

61-193157 8/1986 Japan .

63-294586 12/1988 Japan .

OTHER PUBLICATIONS

Pat. Abs. of Japan, vol. 12, No. 220 Jul. 1986 Miyagi et al.

*Primary Examiner*—Patrick J. Ryan

*Assistant Examiner*—W. Krynski

*Attorney, Agent, or Firm*—Finnegan, Henderson, Farabow, Garrett and Dunner

[57] ABSTRACT

A dielectric member for receiving an electrostatic latent image having excellent chargeability, high surface hardness and high reliability of structure is presented.

It is a dielectric member for receiving an electrostatic image comprising a substrate having thereon a porous anodic aluminum oxide film and an inorganic film formed on said porous anodic aluminum oxide film, wherein the inside of the pores of the porous anodic aluminum oxide film are filled with a dielectric substance having a low relative dielectric constant or are evacuated in the vacuum state and then the pores are clogged with said inorganic film.

8 Claims, 1 Drawing Sheet

DIELECTRIC MEMBER FOR RECEIVING AN ELECTROSTATIC IMAGE

FIELD OF THE INVENTION

This invention relates to a dielectric member for receiving an electrostatic image to be used for ionography.

BACKGROUND OF THE INVENTION

In recent years, as one method for copying or printing, the image forming method has been practiced according to the so-called ionography, in which a drum substrate having a dielectric film is used as the dielectric member for receiving electrostatic image, ions are generated by an ion (charged particle) generation means, an electrostatic latent image is formed on the surface of the dielectric member with the ions, the electrostatic image formed is developed with a toner and transfer-fixed onto a transferring material. In the dielectric member for receiving electrostatic latent image to be used for such ionography, as the dielectric layer, a porous anodic aluminum oxide film has been used. Since the film itself of a porous anodic aluminum oxide film has numberless opened micropores, it has such drawbacks as inferior abrasion resistance, low humidity resistance and also image deterioration caused by penetration of toner particles into the pores, etc. Accordingly, there has been proposed the method, in which after formation of the porous anodic aluminum oxide film, adsorption treatment with a silane coupling agent is carried out and then an epoxy resin is impregnated, or an epoxy resin formulated with a silane coupling agent is impregnated (see JP-A-63-294586) (The term "JP-A" as used herein means an "unexamined published Japanese patent application). Concerning the pore sealing treatment of anodic aluminum oxide film, there have also been known the method of impregnating waxes (see JP-A-60-50083), the method of impregnating polytetrafluoroethylene (see JP-A-61-193157), etc.

When an epoxy resin is impregnated after the adsorption treatment with the silane coupling agent as mentioned above or an epoxy resin containing a silane coupling material is impregnated, humidity resistance is almost improved, but the results are still unsatisfactory with respect to surface hardness, hot stress resistance, etc., and also relative dielectric constant is great, about 7 or more, whereby there has been the problem that sufficiently high chargeability cannot be obtained. Further, in the case of these, the resin baking treatment step is required after the impregnation step and also the eliminating treatment step of the resin surface layer thereafter, whereby there have been involved such problems as complication of the steps, lowering in yield on account of such complicated steps, and lowering in reproducibility of characteristics, etc. Also, when waxes or polytetrafluoroethylene were impregnated as the pore sealing material, there have been involved such problems as low chargeability and humidity resistance, or poor adhesion to porous anodic aluminum oxide film which is a dielectric layer, etc.

The present invention has been accomplished in view of the problems as mentioned above in the prior art.

SUMMARY OF THE INVENTION

An object of the present invention is to provide a dielectric member for receiving electrostatic latent image having excellent chargeability, high surface hardness and also high reliability of the structure.

The present inventors have found that the above object can be accomplished by forming an inorganic film on the surface of an anodic aluminum oxide film, to complete the present invention.

The dielectric member for receiving an electrostatic image comprising a substrate having thereon a porous anodic aluminum oxide film and an inorganic film formed on said porous anodic aluminum oxide film, wherein the inside of the pores of the porous anodic aluminum oxide film are filled with a low dielectric substance or are evacuated in the vacuum state and then the pores are clogged (i.e., shut) with said inorganic film.

DETAILED DESCRIPTION OF THE INVENTION

In the following, the dielectric member for receiving an electrostatic latent image of the present invention is described in detail.

Figure 1:
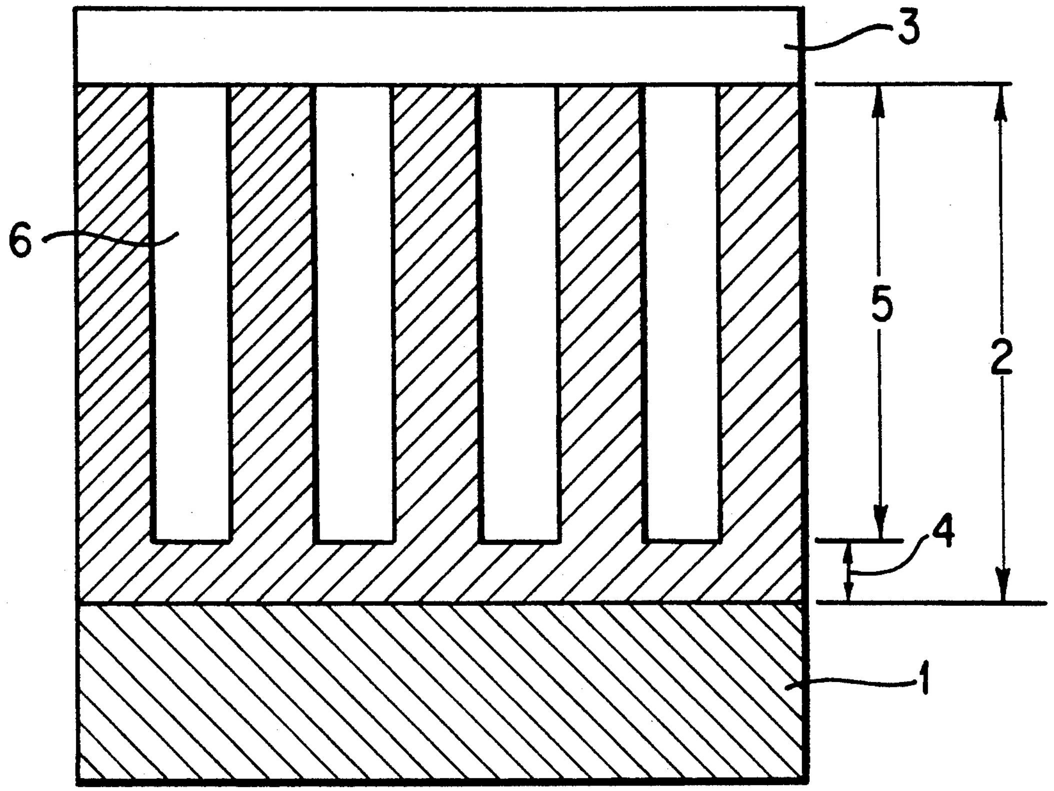
FIG. 1 is a schematic sectional view of the dielectric member for receiving an electrostatic latent image of the present invention.

FIG. 1 is a schematic sectional view of the dielectric member for receiving an electrostatic latent image of the present invention. Reference numeral 1 is a substrate, 2 is a porous anodic aluminum oxide film, 3 is an inorganic film. The porous anodic aluminum oxide film 2 comprises a barrier layer portion 4 and a porous layer portion 5 having numberless pores 6, and the upper opened ends of the pores being clogged (i.e., shut) with the inorganic film.

In the present invention, as the substrate, any of aluminum and its alloys (hereinafter, these are called merely as aluminum), electroconductive substrates other than aluminum and insulating substrates can be used, but when a substrate other than aluminum is employed, it is required that an aluminum film having a thickness of at least 5 μm should be formed on at least the surface which is in contact with other layers. Such aluminum film can be formed according to the vapor deposition method, the sputtering method, the ion plating method, etc. As the electroconductive substrate other than aluminum, metals such as stainless steel, nickel, chromium, etc., and alloys thereof may be employed, and as the insulating substrate, polymer films or sheets of polyester, polyethylene, polycarbonate, polystyrene, polyamide, polyimide, etc., glasses, ceramics, etc., may be employed.

In the present invention, as the aluminum material for obtaining an anodic aluminum oxide film with good characteristics, in addition to materials of the pure Al system, a material can be suitably selected and used from among aluminum alloy materials such as the Al-Mg system, Al-Mg-Si system, Al-Mg-Mn system, Al-Mn system, Al-Cu-Mg system, Al-Cu-Ni system, Al-Cu system, Al-Si system, Al-Cu-Zn system, Al-Cu-Si system, Al-Mg-Si system, etc.

By anodizing the aluminum surface of the substrate in an aqueous solution containing an electrolyte, a porous anodic aluminum oxide film comprising a desired barrier layer portion having the specific thickness and a porous layer portion is formed. Anodic oxidation can be carried out according to a known method, and as the electrolyte, various compounds such as a sulfuric acid, an oxalic acid, a tartaric acid, a phosphoric acid, a sulfonic acid, a chromic acid, benzenesulfonic acid, etc., can be used. Among them, oxalic acid or tartaric acid can be particularly preferably used, because heat resistance is high and therefore cracks can be formed with difficulty, and also a porous anodic aluminum oxide film with large pore sizes of about 15 to 20 nm in pore diameter can be formed to be effective for lowering the relative dielectric constant of the dielectric member for receiving electrostatic latent image of the present invention.

For electrolysis, either direct current or alternating current can be used. In the following, description is made of applying direct current, but also in the case of alternating current, an anodic aluminum oxide film can be formed in analogous manner.

First, the surface is finished by mirror surface cutting, and the substrate having the aluminum surface worked to a desired shape is subjected to ultrasonic cleaning (washing) in an organic solvent or a Freon solvent, and subsequently to ultrasonic cleaning in pure water.

Subsequently, an anodic aluminum oxide film is formed on the substrate. An electrolytic solution (anodizing solution) is filled to a predetermined level in an electrolytic tank (anodizing tank) made of a stainless steel or a hard glass, etc. As the electrolytic solution, generally, a solution in which the above electrolyte is dissolved in pure water is used. The electrolyte concentration in pure water may be 0.05 to 60% by weight, more preferably 0.5 to 40% by weight. As the pure water to be used, distilled water or ion-exchanged (i.e., deionized) water, etc. can be used, but it is required that impurities such as chlorine component, etc. should be sufficiently removed for prevention of corrosion or pinhole generation in the anodic aluminum oxide film.

Next, into the electrolytic solution is dipped, as the anode, a substrate having the above-mentioned aluminum surface, and also, as the cathode, a stainless steel plate, an aluminum plate or carbon plate, with a certain interelectrode distance apart therefrom. The interelectrode distance may be suitably set between 0.1 cm and 100 cm. A direct power source device is prepared, its positive (plus) terminal is connected to the aluminum substrate, and its negative (minus) terminal to the cathode plate, respectively, and a current is passed between the both electrodes of anode and cathode in the electrolytic solution. Electrolysis is carried out according to the constant current method or the constant voltage method in ordinary manner, and the direct current applied may be either one consisting of the direct current component alone or one combination with the alternating current component being overlapped. By such current passage, an anodic aluminum oxide film is formed on the aluminum surface of the substrate which is the anode.

The thus-formed anodic aluminum oxide film comprises a nonporous barrier layer portion having a thickness in proportion to the electrolysis voltage and a porous layer portion formed thereon. The current density during practice of the anodizing is set within the range of 0.1 to 10 $A.dm^{-2}$. In view of the film formation speed and the cooling efficiency, it should be preferably set within the range of 0.5 to 5.0 $A.^{-2}$. On the other hand, the anodizing voltage may be generally 3 to 350 V, preferably 7 to 300 V. The liquid temperature of the electrolytic solution is set at $-10°$ to 95° C., preferably $-5°$ to 60° C.

In the present invention, one of the most preferable examples form the standpoints of formation efficiency, formation speed, film properties, etc., is to practice electrolysis by use of a 1 to 20% by weight of aqueous oxalic acid solution at a temperature of from $-5°$ to 40° C. Another of more preferable examples is to practice electrolysis by use of a 1 to 40% by weight of aqueous tartaric acid solution at a temperature of from 0° to 70° C.

The film thickness of the porous anodic aluminum oxide film can be controlled by varying the electrolysis time so as to be made within the range of from 5 to 70 μm, preferably from 10 to 50 μm. In this case, with a thickness of less than 5 μm, the chargeability is decreased, while when it exceeds 70 μm, the production cost is increased, whereby film cracking will be undesirably generated. The thus formed anodic aluminum oxide film is subjected to treatment such as washing with pure water, etc., if desired, before drying.

In the present invention, the total value of the surface area (i.e., the projected surface area of the upper opened ends of the pores) of pore portions when the total surface area of the anodic aluminum oxide film (pore portion and alumina portion other than pores) is made as 1 should be preferably within the range of 0.2 to 0.8. The above range is preferable because, if the area of the pores becomes excessively large, the mechanical strength of the anodic aluminum oxide film will be lowered, while if it becomes smaller, the relative dielectric constant of the dielectric member for receiving electrostatic latent image of the present invention becomes higher to lower chargeability.

Subsequently, on the anodic aluminum oxide film is formed an inorganic film. As the material constituting the inorganic film, $SiN_x$ (wherein x is 0.3 to 1.33), $Si_{l-x}C_x$ (wherein x is 0.2 to 0.99), a-C, a-Si, $SiO_x$ (wherein x is 0.5 to 2.0), $AlO_x$ (wherein x is 0.7 to 1.5), diamond-like carbon, etc. may be included.

Examples of the inorganic film include a non-photoconductive film such as silicon nitride films, amorphous carbon films; and a photoconductive film such as amorphous silicon films, silicon carbide films. The difference between a non-photoconductive films and a photoconductive films can be distinguished by measuring the dark current and photo-current of the formed inorganic film. The photoconductive films has a clear difference between the dark current and light current. But the non-photoconductive films have no difference between the dark current and photo-current.

The inorganic film can be formed according to the vacuum vapor deposition method, the glow discharging decomposition method, the sputtering method, the ion plating method, the plasma CVD method and the electron beam vapor deposition method, etc. Among these, the plasma CVD method is preferred. The film thickness may be set within the range of from 0.5 to 20 μm, preferably from 1 to 10 μm.

When the inorganic film is formed according to the plasma CVD method, the $SiN_x$ film can be formed by using silane or a silane derivative, and a nitrogen containing compound or nitrogen single substance, as the starting material. Examples of the silane or the silane derivative to be used include $SiH_4$, $Si_2H_6$, $SiCl_4$, $SiHCl_3$, $SiH_2Cl_2$, $Si_3H_8$, $Si_4H_{10}$, etc. Examples of the nitrogen containing compound include $NH_3$, $N_2H_4$, $HN_3$ etc.

The a-C film and diamond-like carbon film can be formed by using paraffin based hydrocarbons such as methane, ethane, propane, butane, pentane and the like; olefin based hydrocarbons such as ethylene, propylene, butylene, pentene and the like; acetylene based hydrocarbons such as acetylene, allylene, butylene and the like; alicyclic hydrocarbons such as cyclopropane, cyclobutane, cyclopentane, cyclohexane and the like; aromatic hydrocarbons such as benzene, toluene, xylene, naphthalene, anthracene and the like; or halogenated hydrocarbons such as carbon tetrachloride, chloroform, chlorotrifluoromethane, dichlorodifluoromethane and the like, as the starting material.

The $Si_{l-x}C_x$ film can be formed by using the above-mentioned silane or silane derivative and the above-mentioned hydrocarbon, in combination as the starting material.

The $SiO_x$ film can be formed by using the above-mentioned silane or silane derivative and oxygen single substance or an oxygen containing compound, in combination as the starting material. As the oxygen containing compound, for example, carbon monoxide, carbon dioxide, nitrogen monoxide, nitrogen dioxide, etc., can be employed.

The a-Si film can be formed by using the above-mentioned silane or derivative, as the starting material.

The film forming conditions are as follows, That is, the frequency may be generally 0 to 5 GHz, preferably 0.5 to 3 GHz, the vacuum degree during discharging may be generally $10^{-5}$ to 5 Torr (0.001 to 665 Pa), and the substrate heating temperature may be generally 50° to 400° C.

The thickness of the inorganic film is generally 0.5 to 20 μm and preferably 1 to 10 μm. When the photoconductive film is used as the inorganic film, it is preferred that the photoconductive film have a large thickness because the photoconductive film generally shows the dark decay. Accordingly, the thickness of the photoconductive film is generally 2 μm or more and preferably 3 to 10 μm.

The inorganic film formed according to these plasma CVD methods has generally a Vickers' hardness of about 1000 or higher, which is very useful for extension of life of the dielectric member for receiving an electrostatic latent image.

The dielectric member for receiving electrostatic latent image of the present invention has the surface of the porous anodic aluminum oxide film covered with an inorganic film, and therefore has a structure with air (or vacuum) being confined within pores. The air (or vacuum) functions as the dielectric body together with the alumina of the anodic aluminum oxide film matrix, and because air (or vacuum) has a relative dielectric constant $\epsilon=1$, the relative dielectric constant of the whole dielectric member for receiving electrostatic latent image of the present invention is decreased, thus contributing greatly to the increase of chargeability.

Examples of low dielectric substance which can be filled in the inside of the pores other than the air (or vacuum) include a hydrogen gas, a nitrogen gas, an oxygen gas, a hydrocarbon gas, a halogen gas, a silane gas, a phosphine gas, a diborane gas, etc.

When the inorganic film is formed by the vacuum vapor deposition method, the glow discharging method, the sputtering method, the ion plating method, the plasma CVD method or the electron beam vapor deposition, the reaction gas which is used for forming the inorganic film may remain in the inside of the pores of the porous anodic aluminum oxide film. The resins having the dielectric constant of 4 or less such as an epoxy resin, a fluorocarbon resin, a carnauba wax and a silicon hard coating agent other than the above gas of low dielectric substance may be filled in the inside of the pores of the porous anodic aluminum oxide film.

Figure 2:
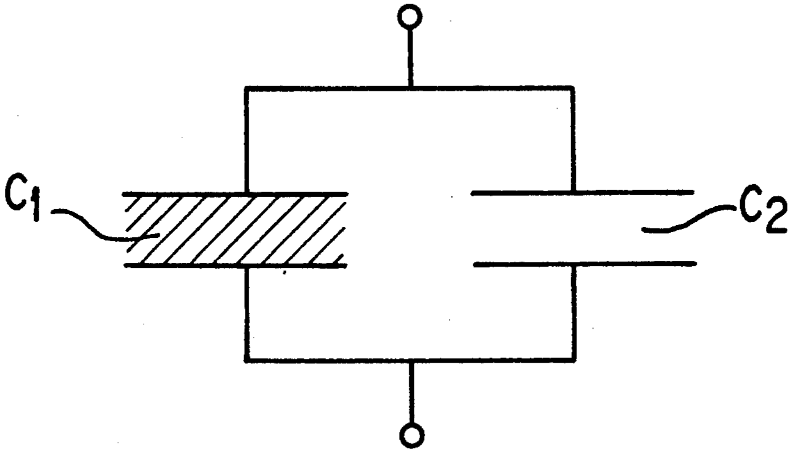
FIG. 2 is a condenser circuit diagram for illustration of the model of operation of the present invention.

FIG. 2 shows a model of the electrical circuit in that case. In the Figure, $C_1$ shows the alumina portion of the anodic aluminum oxide film, $C_2$ shows the pore portion (air or vacuum). When a voltage is applied between the inorganic film surface and the substrate, since a parallel circuit of condenser as shown in FIG. 2 is formed, the relative dielectric constant $\epsilon$ of the whole dielectric member for receiving electrostatic latent image becomes a value between $C_1$ and $C_2$. More specifically, when the relative dielectric constant of alumina is $\epsilon_1$, the relative dielectric constant of the pore portion (air or vacuum) is $\epsilon_2$, the whole surface area of the porous anodic aluminum oxide film is 1, the total surface area of the pore portion (air or vacuum) is S (pore area ratio) and the total surface area of the alumina portion excluding the pore portion is (1−S), the relative dielectric constant $\epsilon$ of the whole dielectric member for receiving electrostatic latent image of the present invention is represented by the following formula, namely:

$$\epsilon=\epsilon_1(1-S)+\epsilon_2 S$$

Since the relative dielectric constant $\epsilon_2$ of air (or vacuum) is 1, and the relative dielectric constant $\epsilon_1$ of alumina is 10, for example, when the pore area ratio S is 0.6, $\epsilon$ becomes 4.0, whereby the relative dielectric constant as a whole is extremely decreased as compared with the relative dielectric constant in the case of alumina alone, and therefore chargeability is increased.

The present invention is described in detail below by referring to examples.

EXAMPLE 1

By use of a cylindrical aluminum pipe of about 100 mm in diameter comprising an Al-Mg alloy having a purity of 99.99% as the substrate, Freon washing and ultrasonic washing with distilled water were carried out. Subsequently, by use of a 3% by weight of oxalic acid solution as the electrolytic solution, while maintaining the liquid temperature at 28° C., a direct current voltage of 30 V was applied between the aluminum pipe and an aluminum plate which is a cylindrical cathode to carry out the anodizing for 60 minutes. The anodic aluminum oxide film formed had a thickness of 20 μm.

The thus formed aluminum pipe having thereon a porous anodic aluminum oxide film was subjected to ultrasonic washing with distilled water, dried at 50° C., and then placed in the vacuum tank of a capacitively coupled type plasma CVD apparatus. While the aluminum pipe was maintained at 200° C., 100% silane gas was applied into the vacuum tank at 110 $cm^3$/min, hydrogen gas was applied at 500 $cm^3$/min., and then ammonia gas was applied at 550 $cm^3$/min to maintain the inner pressure in the vacuum tank at 1.0 Torr (133 Pa), followed by applying a high frequency power of 13.56 MHz to generate glow discharging, and the output of the high frequency power source was maintained to 350 W. Thus, on the porous anodic aluminum oxide film, an inorganic film comprising silicon nitride having a thickness of about 2 μm was formed.

The obtained dielectric member for receiving electrostatic latent image had a relative dielectric constant of 4.2, and the charging potential (surface potential) when giving the surface charges of 46 $nC/cm^2$ as the charge density was 250 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1500, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 2

By use of cylindrical aluminum pipe of about 100 mm in diameter comprising an Al-Mg alloy having a purity of 99.99% as the substrate, Freon washing and ultrasonic washing with distilled water were carried out. Subsequently, by use of a mixed solution of 2.5% by weight of tartaric acid and 0.08% by weight of ammonium tartarate as the electrolytic solution, while maintaining the liquid temperature at 40° C., a direct current voltage of 80 V was applied between the aluminum pipe and an aluminum plate which is a cylindrical cathode to carry out the anodizing for 60 minutes. The anodic aluminum oxide film formed had a thickness of 18 μm.

The thus formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 1, an inorganic film comprising silicon carbide was formed.

The obtained dielectric member for receiving electrostatic latent image had a relative dielectric constant of 4.3, and the charging potential (surface potential) when giving the surface charges of 46 $nC/cm^2$ as the charge density was 217 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under both environments.

When the surface hardness of the dielectric member for receiving electrostatic latent image was measured, the Vickers' hardness was 1500, which was very hard. The dielectric member for receiving electrostatic latent image was placed in an image forming device according to ionography of the pressure transfer system, and the image was evaluated. As a result, a sharp image without defect was obtained. Also, no generation of flaws caused by the pressure transfix roll or cleaning blade made of a metal was observed.

EXAMPLE 3

By use of cylindrical aluminum pipe of about 100 mm diameter comprising an Al-Mg alloy having a purity of 99.99% as the substrate, Freon washing and ultrasonic washing with distilled water were carried out. Subsequently, by use of 10% by weight of sulfuric acid as the electrolytic solution, while maintaining the liquid temperature at 28° C., a direct current voltage of 15 V was applied between the aluminum pipe and an aluminum plate which is a cylindrical cathode to carry out the anodizing for 35 minutes. The anodic aluminum oxide film formed had a thickness of 22 μm.

The thus formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 1, an inorganic film comprising silicon nitride was formed.

The obtained dielectric member for receiving electrostatic latent image had a relative dielectric constant of 4.8, and the charging potential (surface potential) when giving the surface charges of 46 $nC/cm^2$ as the charge density was 238 V. The decay of the charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1500, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 4

By use of a cylindrical aluminum pipe of about 100 mm in diameter comprising an Al-Mg alloy having a purity of 99.99% as the substrate, Freon washing and ultrasonic washing with distilled water were carried out. Subsequently, by use of a 3% by weight of oxalic acid solution as the electrolytic solution, while maintaining the liquid temperature at 33° C., a direct current voltage of 30 V was applied between the aluminum pipe and an aluminum plate which is a cylindrical cathode to carry out the anodizing for 60 minutes. The anodic aluminum oxide film formed had a thickness of 19 μm.

The thus-formed aluminum pipe having thereon a porous anodic aluminum oxide film was subjected to ultrasonic washing with distilled water, dried at 50° C., and then placed in the vacuum tank of a capacitively coupled type plasma CVD apparatus. While the aluminum pipe was maintained at 200° C., 100% ethylene gas was applied into the vacuum tank at 200 $cm^3/min$, and then hydrogen gas was applied at 200 $cm^3/min$, to maintain the inner pressure in the vacuum tank at 0.6 Torr (80 Pa), followed by applying a high frequency power of 13.56 MHz to generate glow discharging, and the output of the high frequency power source was maintained to 700 W. Thus, on the porous anodic aluminum oxide film, an inorganic film comprising amorphous carbon having a thickness of about 1.2 μm was formed.

The obtained dielectric member for receiving electrostatic latent image had a relative dielectric constant of 4.0, and the charging potential (surface potential)

when giving the surface charges of 46 $nC/cm^2$ as the charge density was 247 V. The decay of charging potential accompanied with lapse of time after charging was extremely decreased to 1%/5 sec. or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 3400, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 5

By use of cylindrical aluminum pipe of about 100 mm in diameter comprising an Al-Mg alloy having a purity of 99.9% as the substrate, Freon washing and ultrasonic washing with distilled water were carried out. Subsequently, by use of a mixed solution of 2.5% by weight of tartaric acid and 0.08% by weight of ammonium tartarate as the electrolytic solution, while maintaining the liquid temperature at 50° C., a direct current voltage of 100 V was applied between the aluminum pipe and an aluminum plate which is a cylindrical cathode to carry out the anodizing for 70 minutes. The anodic aluminum oxide film formed had a film thickness of 20 μm.

The thus formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 4, an inorganic film comprising amorphous carbon was formed.

The obtained dielectric member for receiving electrostatic latent image had a relative dielectric constant of 4.2, and the charging potential (surface potential) when giving the surface charges of 46 $nC/cm^2$ as the charge density was 250 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 3400, which was very hard. The dielectric member for receiving electrostatic latent image was placed in an image forming device according to ionography of the pressure transfix system, and the image was evaluated. As a result, a sharp image without defect was, obtained. Also, no generation of flaws caused by the pressure transfix roll or cleaning blade made of a metal was observed.

EXAMPLE b 6

By use of cylindrical aluminum pipe of about 100 mm in diameter comprising an Al-Mg alloy having a purity of 99.99% as the substrate, Freon washing and ultrasonic washing with distilled water were carried out. Subsequently, by use of 10% by weight of sulfuric acid as the electrolytic solution, while maintaining the liquid temperature at 30° C., a direct current voltage of 20 V was applied between the aluminum pipe and an aluminum plate which is a cylindrical cathode to carry out the anodizing for 50 minutes. The anodic aluminum oxide film formed had a thickness of 18 μm.

The thus formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 4, an inorganic film comprising amorphous carbon was formed.

The obtained dielectric member for receiving electrostatic latent image had a relative dielectric constant of 5.1, and the charging potential (surface potential) when giving the surface charges of 46 $nC/cm^2$ as the charge density was 183 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 3400, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 7

By use of cylindrical aluminum pipe of about 100 mm in diameter comprising an Al-Mg alloy having a purity of 99.99% as the substrate, Freon washing and ultrasonic washing with distilled water were carried out. Subsequently, by use of 3% by weight of oxalic aid solution as the electrolytic solution, while maintaining the liquid temperature at 28° C., a direct current voltage of 30 V was applied between the aluminum pipe and an aluminum plate which is a cylindrical cathode to carry out the anodizing for 60 minutes. The anodic aluminum oxide film formed had a thickness of 20 μm.

The thus-formed aluminum pipe having thereon a porous anodic aluminum oxide film was subjected to ultrasonic washing with distilled water, dried at 50° C., and then placed in the vacuum tank of a capacitively coupled type plasma CVD apparatus. While the aluminum pipe was maintained at 250° C., 100% silane gas was applied into the vacuum tank at 50 $cm^3$/min, methane gas was applied at 1000 $cm^3$/min, to maintain the inner pressure in the vacuum tank at 0.7 Torr (93 Pa), followed by applying a high frequency power of 13.56 MHz to generate glow discharging, and the output of the high frequency power source was maintained to 500 W. Thus, on the porous anodic aluminum oxide film, an inorganic film comprising silicon carbide having a thickness of about 2.2 μm was formed.

The obtained dielectric member for receiving electrostatic latent image had a relative dielectric constant of 4.3, and the charging potential (surface potential) when giving the surface charges of 46 $nC/cm^2$ as the charge density was 242 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1250, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 8

By use of a cylindrical aluminum pipe of about 100 mm in diameter comprising an Al-Mg alloy having a purity of 99.99% as the substrate, Freon washing and ultrasonic washing with distilled water were carried out. Subsequently, by use of a 8% by weight of phosphoric acid as the electrolytic solution, while maintaining the liquid temperature at 35° C., a direct current voltage of 25 V was applied between the aluminum pipe and an aluminum plate which is a cylindrical cathode to carry out the anodizing for 70 minutes. The anodic aluminum oxide film formed had a film thickness of 23 μm.

The thus-formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 7, an inorganic film comprising silicon carbide was formed.

The obtained dielectric member for receiving electrostatic latent image had a relative dielectric constant of 5.4, and the charging potential (surface potential) when giving the surface charges of 46 $nC/cm^2$ as the charge density was 221 V. The decay of charging potential accompanied with lapse of time after charging was extremely decreased to 1%/5 sec. or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1250, which was very hard. The dielectric member for receiving electrostatic latent image was placed in an image forming device according to ionography of the pressure transfix system, and the image was evaluated. As result, a sharp image without defect was obtained. Also, no generation of flaw caused by pressure transfix roll or cleaning blade made of a metal was observed at all.

EXAMPLE 9

By use of cylindrical aluminum pipe of about 100 mm in diameter comprising an Al-Mg alloy having a purity of 99.99% as the substrate, Freon washing and ultrasonic washing with distilled water were carried out. Subsequently, by use of a mixed solution of 2.5% by weight of tartaric acid and 0.08% by weight of ammonium tartarate as the electrolytic solution, while maintaining the liquid temperature at 45° C., a direct current voltage of 80 V was applied between the aluminum pipe and an aluminum plate which is a cylindrical cathode to carry out the anodizing for 60 minutes. The anodic aluminum oxide film formed had a film thickness of 18 μm.

The thus-formed aluminum pipe having thereon a porous anodic aluminum oxide film was subjected to ultrasonic washing with distilled water, dried at 50° C., and then placed in the vacuum tank of a capacitively coupled type plasma CVD apparatus. Then, in the same manner as in Example 7, an inorganic film comprising silicon carbide was formed.

The obtained dielectric member for receiving electrostatic latent image had a relative dielectric constant of 4.1, and the charging potential (surface potential) when giving the surface charges of 46 $nC/cm^2$ as the charge density was 228 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1250, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

EXAMPLE 10

By use of cylindrical aluminum pipe of about 100 mm in diameter comprising an Al-Mg alloy having a purity of 99.99% as the substrate, Freon washing and ultrasonic washing with distilled water were carried out. Subsequently, by use of 3% by weight of oxalic acid solution as the electrolytic solution, while maintaining the liquid temperature at 28° C., a direct current voltage of 30 V was applied between the aluminum pipe and an aluminum plate which is a cylindrical cathode to carry out the anodizing for 60 minutes. The anodic aluminum oxide film formed had a thickness of 20 μm.

The thus-formed aluminum pipe having thereon a porous anodic aluminum oxide film was subjected to ultrasonic washing with distilled water, dried at 50° C., and then placed in the vacuum tank of a capacitively coupled type plasma CVD apparatus. While the aluminum pipe was maintained at 200° C., 100% silane gas was applied into the vacuum tank at 250 $cm^3$/min, oxygen gas was applied at 5 $cm^3$/min, to maintain the inner pressure in the vacuum tank at 0.5 Torr (66.5 Pa), followed by applying a high frequency power of 13.56 MHz to generate glow discharging, and the output of the high frequency power source was maintained to 350 W. Thus, on the porous anodic aluminum oxide film, an inorganic film comprising silicon oxide having a thickness of about 1.5 μm was formed.

The obtained dielectric member for receiving electrostatic latent image had a relative dielectric constant of 4.3, and the charging potential (surface potential)

when giving the surface charges of 46 $nC/cm^2$ as the charge density was 242 V. The decay of charging potential accompanied with lapse of time after charging was extremely decreased to 1%/5 sec or less. Further, when chargeability was measured under the environments of a temperature 20° C. and a relative humidity 15%, and a temperature 20° C. and a relative humidity 75%, the charging potential was entirely the same under the both environments.

When the surface hardness of the dielectric member for receiving electrostatic latent image was measured, the Vickers' hardness was 1220, which was very hard. The dielectric member for receiving electrostatic latent image was placed in an image forming device according to ionography of the pressure transfix system, and the image was evaluated. As a result, a sharp image without defect was obtained. Also, no generation of flaws caused by the pressure transfix roll or cleaning blade made of a metal was observed.

COMPARATIVE EXAMPLE 1

After formation of the porous anodic aluminum oxide film in the same manner as in Example 1, the porous anodic aluminum oxide film formed was subjected to a silane coupling agent treatment and an epoxy resin impregnation treatment. That is, by use of γ-glycidoxy-propyl-trimethoxysilane as the silane coupling agent, the thus-formed aluminum pipe having thereon the above anodic aluminum oxide film was dipped in 1% by weight of the aqueous solution at a bath temperature of 20° C. for 2 minutes, drawn up and then heated at 100° C. for 15 minutes. Subsequently, an epoxy resin paint (KANCOAT 51-L105B, produced by Kansai Paint K.K.) was coated by brush coating, and hardened by heating at 210° C. for 30 minutes. Next, the resin layer on the surface was removed with a knife, the surface was polished with a polishing paper to form a dielectric member for receiving electrostatic latent image. This member had a relative dielectric constant of 7.0, and the charging potential (surface potential) when giving surface charges of 46 $nC/cm^2$ as charge density was 148 V. The decay of charging potential accompanied with lapse of time after charging was 6%/5 sec. Further, when chargeability was measured under the environments of a temperature 20° C. and a relative humidity of 15%, and a temperature 20° C. and a relative humidity of 75%, chargeability was recognized to be dependent on humidity, and the charging potential was decreased to 13% under high humidity environment.

When the surface hardness of the dielectric member for receiving electrostatic latent image was measured, Vickers' hardness was 500. The dielectric member for receiving electrostatic latent image was placed in an image forming device according to ionography of the pressure transfix system, and the image was evaluated. As the result, generation of flaws with the pressure transfix roll or the cleaning blade made of a metal was partially recognized.

COMPARATIVE EXAMPLE 2

After formation of the porous anodic aluminum oxide film in the same manner as in Example 2, the porous anodic aluminum oxide film formed was subjected to a silane coupling agent treatment and an epoxy resin impregnation treatment. That is, by use of γ-glycidoxy-propyl-trimethoxysilane as the silane coupling agent, the thus-formed aluminum pipe having thereon the above anodic aluminum oxide film was dipped in 1% by weight of the aqueous solution at a bath temperature of 20° C. for 2 minutes, drawn up and then heated at 100° C. for 15 minutes. Subsequently, an epoxy resin paint (KANCOAT 51-L105B, produced by Kansai Paint K.K.) was coated by brush coating, and hardened by heating at 210° C. for 30 minutes. Next, the resin layer on the surface was removed with a knife, the surface was polished with a polishing paper to form a dielectric member for receiving electrostatic latent image. This member had a relative dielectric constant of 6.7, and the charging potential (surface potential) when giving surface charges of 46 $nC/cm^2$ as charge density was 140 V. The decay of charging potential accompanied with lapse of time after charging was 5%/5 sec. Further, when chargeability was measured under the environments of a temperature 20° C. and a relative humidity of 15%, and a temperature 20° C. and a relative humidity 75%, chargeability was recognized to be dependent on humidity, and the charging potential was decreased to 9% under high humidity environment.

When the surface hardness of the dielectric member for receiving electrostatic latent image was measured, Vickers' hardness was 530. The dielectric member for receiving electrostatic latent image was placed in an image forming device according to ionography of the pressure transfix system, and the image was evaluated. As the result, generation of flaw with the pressure transfix roll or the cleaning blade made of a metal was partially recognized.

COMPARATIVE EXAMPLE 3

After formation of the porous anodic aluminum oxide film in the same manner as in Example 3, the porous anodic aluminum oxide film formed was subjected to a silane coupling agent treatment and an epoxy resin impregnation treatment. That is, by use of γ-glycidoxy-propyl-trimethoxysilane as the silane coupling agent, the aluminum pipe having the above anodic aluminum oxide film formed thereon was dipped in 1% by weight of the aqueous solution at a bath temperature of 20° C. for 2 minutes, drawn up and then heated at 100° C. for 15 minutes. Subsequently, an epoxy resin paint (KANCOAT 51-L105B, produced by Kansai Paint K.K.) was coated by brush coating, and hardened by heating at 210° C. for 30 minutes. Next, the resin layer on the surface was removed with a knife, the surface was polished with a polishing paper to form a dielectric member for receiving electrostatic latent image. This member had a relative dielectric constant of 7.5, and the charging potential (surface potential) when giving surface charges of 46 $nC/cm^2$ as charge density was 152 V. The decay of charging potential accompanied with lapse of time after charging was found to be 9%/5 sec. Further, when chargeability was measured under the environments of a temperature 20° C. and a relative humidity of 15%, and a temperature 20° C. and a relative humidity of 75%, chargeability was recognized to be dependent on humidity, and the charging potential was decreased to 15% under high humidity environment.

When the surface hardness of the dielectric member for receiving electrostatic latent image was measured, Vickers' hardness was 180. The dielectric member for receiving electrostatic latent image was placed in an image forming device according to ionography of the pressure transfix system, and the image was evaluated. As the result, generation of flaws with the pressure transfix roll or the cleaning blade made of a metal was partially recognized.

The dielectric member for receiving electrostatic latent image of the present invention which has an inorganic film on the surface of a porous anodic aluminum oxide film as described above to maintain the pores under the vacuum state or the state filled with air, has a lower relative dielectric constant as compared with the prior art, and an excellent chargeability, and also a decrease in a potential decay accompanied with lapse of time after charging, and whereby high charging potential can be maintained. Further, since an inorganic film is provided on the surface, the surface hardness is high, and humidity resistance is good. Also, it has excellent stability of electrical characteristics, excellent reproducibility, high reliability of the structure, and particularly good stability to thermal stress.

While the invention has been described in detail and with reference to specific embodiments thereof, it will be apparent to one skilled in the art that various changes and modifications can be made therein without departing from the spirit and scope thereof.

What is claimed is:

1. A dielectric member for receiving an electrostatic image comprising a substrate having thereon a porous anodic aluminum oxide film, and further having an inorganic film formed on said porous anodic aluminum oxide film, wherein the pores of said porous anodic aluminum oxide film are filled with a dielectric substance or are evacuated in the vacuum state and then filled with said inorganic film.

2. The dielectric member of claim 1, wherein said inorganic film comprises at least one film, wherein said film is silicon nitride film, silicon carbide film, silicon oxide film, diamond film, amorphous carbon film or amorphous silicon film.

3. The dielectric member of claim 1, wherein said porous anodic aluminum oxide film is formed by use of an electrolytic solution comprising at least one acid, wherein said acid is oxalic acid or tartaric acid.

4. The dielectric member of claim 1, wherein said inorganic film is formed by the CVD method.

5. The dielectric member of claim 1, wherein said substrate is composed of aluminum or a material which has an aluminum film of at least about 5 micron thickness formed on at least one surface thereof.

6. The dielectric member of claim 1, wherein said porous anodic aluminum oxide film has a thickness of from about 5 microns to about 70 microns.

7. The dielectric member of claim 6, wherein said porous anodic aluminum oxide film has a thickness of from about 10 microns to about 50 microns.

8. The dielectric member of claim 1, wherein the ratio of the projected surface area of said pores to the total surface area of said porous anodic aluminum oxide film is from about 0.2 to about 0.8.

* * * * *